United States Patent [19]

Drummond et al.

[11] Patent Number: 4,956,786
[45] Date of Patent: Sep. 11, 1990

[54] MARKING OR ENGRAVING MACHINE

[75] Inventors: Stephen J. Drummond, Rickmansworth; John W. Henry, Colne, both of England

[73] Assignee: Rolls-Royce plc, London, England

[21] Appl. No.: 296,076

[22] Filed: Jan. 12, 1989

[51] Int. Cl.⁵ ............................................. B23C 3/00
[52] U.S. Cl. .................................. 364/474.02; 409/80
[58] Field of Search ................... 364/474.02; 409/80, 409/187, 188; 400/17-20

[56] References Cited

U.S. PATENT DOCUMENTS

| 4,439,834 | 3/1984 | Dahlgren, Jr. | 364/474.22 |
| 4,625,410 | 12/1986 | Eder | 364/474.24 |
| 4,834,595 | 5/1989 | Cacciotti | 364/474.02 |

Primary Examiner—Allen MacDonald
Attorney, Agent, or Firm—Oliff & Berridge

[57] ABSTRACT

A component part number marking or engraving machine has a microprocessor controlled marking or engraving tool in which a range of part numbers, and the corresponding instructions for operating the tool are stored in memory. Upon calling up the appropriate instruction set a selected part number is automatically marked or engraved on a component. The present invention provides a fixture for receiving the component and has a plurality of sensors responsive to the physical dimensions of a range of components and disposed so as to uniquely identify each type of component in the range. Each valid combination of sensors signals is indexed against the appropriate part number and is used to retrieve the corresponding engraver operating instructions from memory.

11 Claims, 7 Drawing Sheets

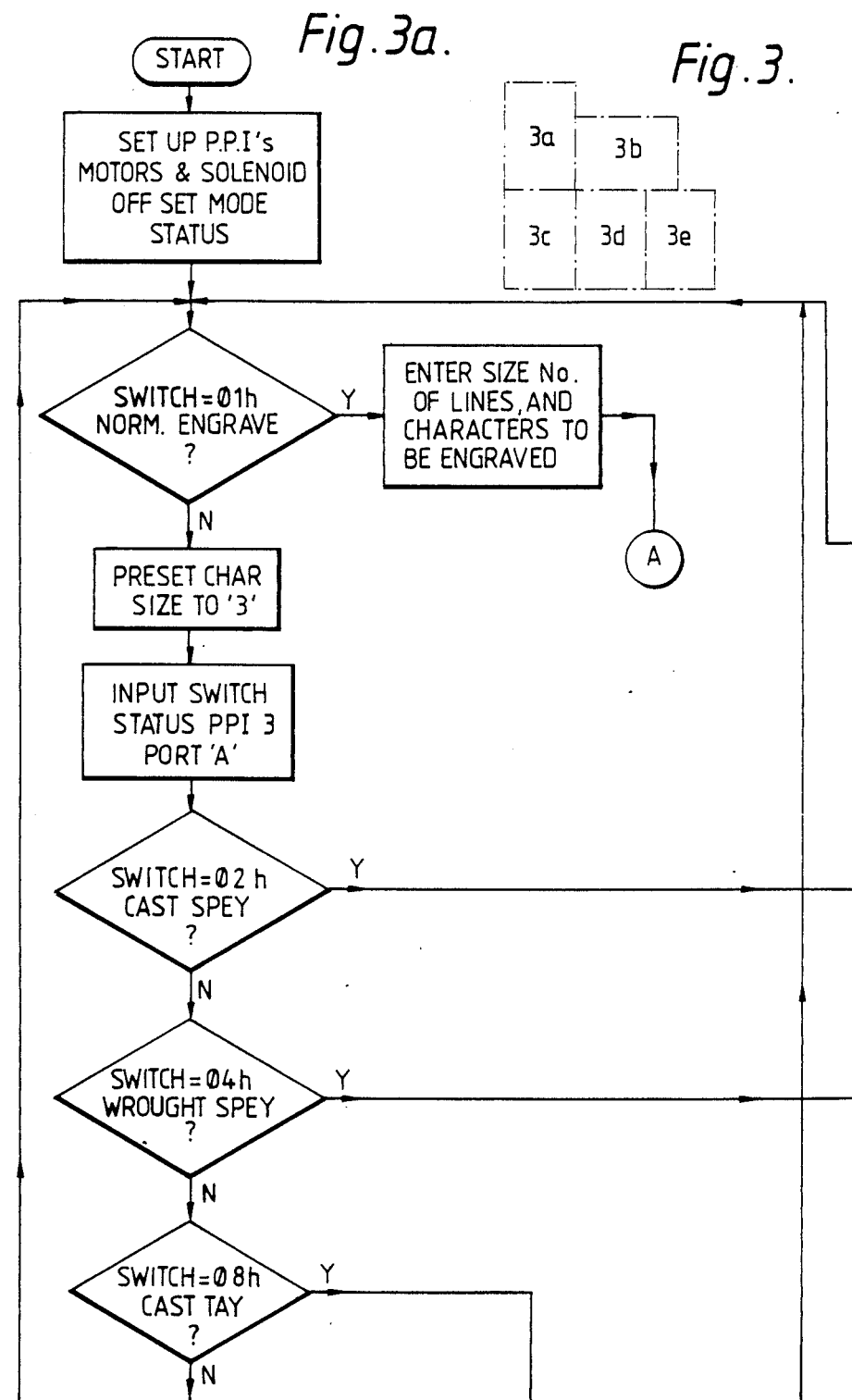

MARKING OR ENGRAVING MACHINE

The invention relates to a marking or engraving machine.

Particularly, but not exclusively, the invention relates to a microprocessor controlled engraving machine of the type described in British Patent GB No. 2002694. A machine of the type referred to has a power operated engraving tool and translation means for producing relative movement between a workpiece, i.e. an item to be engraved, and the engraving tool in a raster pattern. The control system further includes means for causing the tool to operate intermittently to mark the workpiece at such points in the relative movement as will cause a desired part number to be built up by the aggregate of those marks. The instructions for operation of the tool relative to the raster scan pattern are stored in random access memory.

In the described prior arrangement of GB No. 2 002 694 the memory contained in the engraving tool control unit stores only one part number, although this may comprise several alpha-numeric digits. This part number has to be loaded manually by an operator through a keyboard. The control system provides no choice of part numbers which may be engraved unless the contents of the memory store is erased and a fresh part number loaded. However, it was envisaged that for the purposes of sequence numbering a facility might be provided for incrementing the stored sequence number by one least significant digit upon each occasion that the memory is interrogated.

Such arrangements as those described above lack certain elements of flexibility and versatility in that they are able only to mark part numbers on batches of components of one type only, otherwise the stored part number has to be changed as required for individual components. Clearly, these arrangements are only efficient if components of one type have been previously grouped together. Even then it is encumbant upon an operator to load the correct part number for each group of components.

The present invention seeks to overcome these drawbacks by providing an engraving machine capable of handling a variety of different types of components, of recognizing the individual types of components, and of selecting the appropriate part number for each type from a range of alternative part numbers.

According to the present invention there is provided a marking or engraving machine comprising means for identifying a range of different types of components, memory means for storing in machine readable form part numbers for each of the different types of component, means responsive to an identification of a component to retrieve from said memory means a corresponding part number and means operative to mark or engrave said part number on the component.

Preferably the means for identifying the different components comprises means for sensing differences in the physical properties, for example, differences in the dimensions of different types of components.

The apparatus may be fully automatic in operation, requiring an operator merely to load and remove components at the beginning and end of an operational cycle, or, it may be semi-automatic, that is its operation proceeds in stages and requires some simple operator interaction before proceeding with the next stage.

The invention will now be described further with particular reference, merely by way of example, to an embodiment illustrated in the accompanying drawings, in which.

Figure 1:
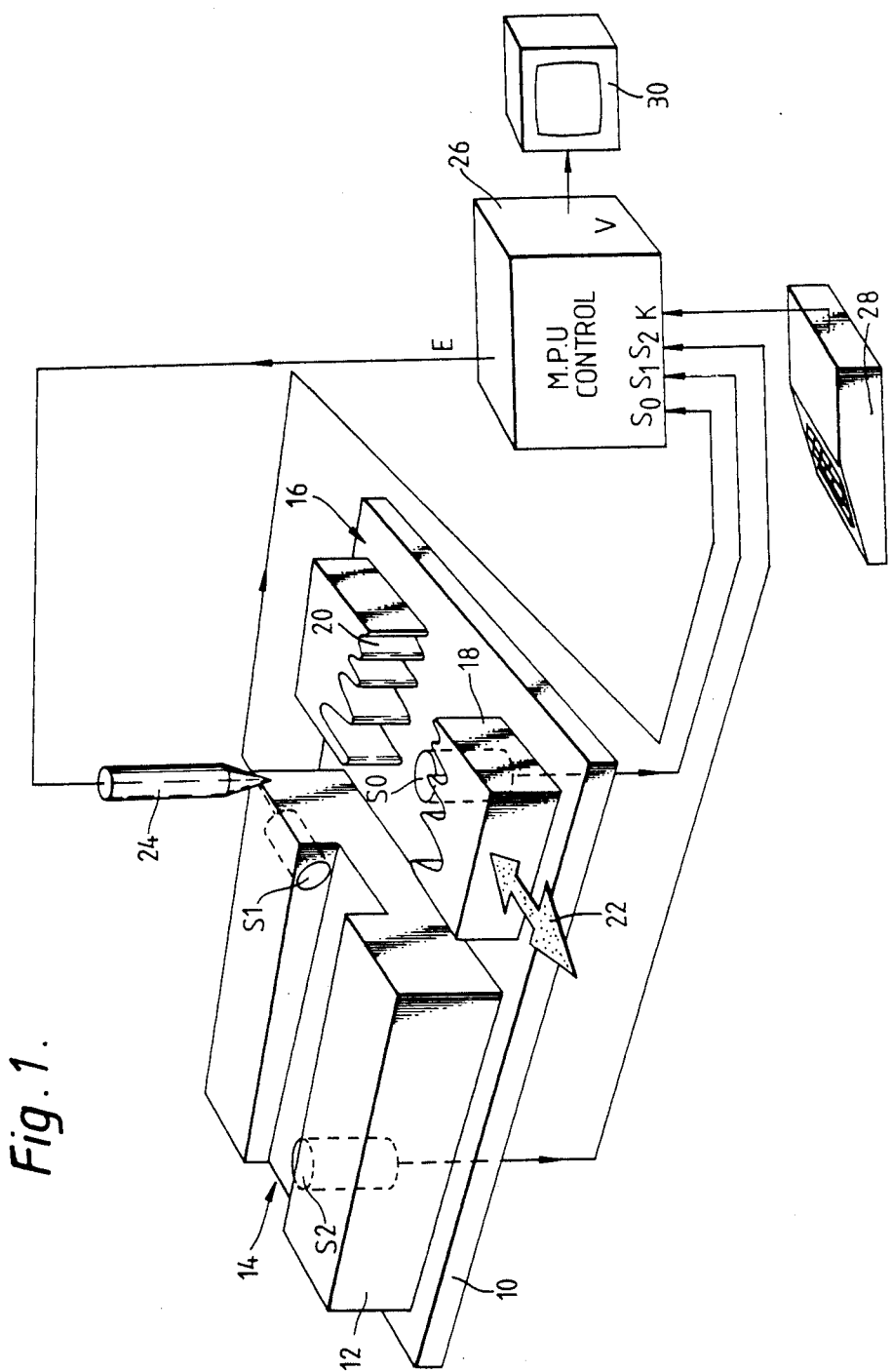
FIG. 1 is a diagrammatic illustration of the major components of an engraving machine for gas turbine engine blades.

The exemplary marking or engraving machine is used to identify gas turbine engine blades belonging to one of a range of different types, each type having particular identifying characteristics, and to mark each blade with an appropriate part number. The machine comprises basically a base 10 upon which is mounted a cradle 12 having a channel or recessed bed 14 conforming roughly to the shape of an aerofoil section of a gas turbine blade. Disposed on the base 10 and to one side of the cradle 12 in line with the long axis of channel 14 is a blade root clamp, generally indicated at 16. This clamp 16 comprises two relatively movable blocks 18, 20 one of which is mounted for lateral movement on the base 10 in the direction of arrows 22. The clamp block 18 is mounted for movement in the plane of base 10 towards and away from block 20 which constitutes a fixed datum. The opposing faces of blocks 18 and 20 are serriform in shape and cooperate to form a clamp for the "fir-tree" root portion of a turbine blade. The blocks 18, 20 may be formed with any required shape to the clamping face as they serve merely to positively locate a blade for both measurement and engraving as will be apparent from the following description.

In the presently described embodiment at the beginning of an operational cycle a turbine blade is placed with its fir-tree root section between the clamp blocks 18, 20 so that a root shank between the blade root and the aerofoil section lies between the clamp 16 and the cradle 12. The clamp blocks 18, 20 are spaced from the cradle 12 to accommodate the root shank. The clamp is then tightened to hold the blade in position for the remainder of the cycle.

A power operated engraving tool 24 is supported by an adjustable supporting arm and column (not shown) mounted on the base 10. The height of the supporting arm may be adjusted so that the engraving tool 24 can be lowered into the proper position for marking a component clamped in position in the cradle 12. The turbine blades are marked on one face of the root shank. The engraving tool, its construction, operation and manner of control may be as described in the previously mentioned British Patent GB No. 2 002 694. Other engraving tools, or indeed other forms of equipment for applying an identifying mark, may be used alternatively to the described exemplary arrangement. Since this is really only incidental to the invention the particular arrangement will not be described further.

A plurality of sensors are mounted in and around the cradle 12 for the purpose of identifying the different types of component. The sensors employed are non-contact proximity sensors and, by means of the inductive effect caused by close proximity to metal, monitor selected physical dimensions of a component. Basically each sensor comprises a miniature coil which is excited by a pulsed or AC signal and which is connected in a circuit responsive to the effect of the change in impedance of the coil caused by close proximity on the axis of the coil of a conductive metal object. Typically, the sensing range of the coils is of the order to 1 to 4 mm. Thus, a sensor may be located at a selected position where, for some components, metal would be expected to be within its sensing range. Two such sensors S1 and S2 are used in combination in the invention to distinguish components placed in the cradle 12 from each other. A third similar sensor S0 is located to sense the presence of a component in the cradle.

As previously mentioned the cradle 12 and clamp 18, 20 are designed to accept turbine blades, with the root section held in the clamp, a root shank section lying between the clamp and the cradle, and the aerofoil shaped blade lying along the longitudinal recess of the cradle. The sensor S0 is located between the clamp blocks 18, 20 with its axis disposed vertically in a position where it will sense metal when a blade root is inserted in the clamp. Sensor S1 is located in a fixed position towards one end of the cradle 12 with its axis perpendicular to that of S0 in order to respond to blades having a root shank dimension falling within the sensing range of the coil. Similarly, sensor S2 is fixed in the bed of the cradle towards the opposite end thereof in order to sense blades having a longitudinal dimension at least equal to spacing of the sensor from the root clamp.

In the described example two sensors S1 and S2 are sufficient to unequivocably distinguish between each of the three possible types of blade that may be presented for engraving. The third sensor S0 is used only to detect the presence of a blade in the cradle. Dependent upon the number of possible blade types and the relatively different dimensions it may be necessary to provide more sensors and to position even the corresponding sensors in different locations. Exact requirements will vary but will be apparent in individual circumstances. It is also envisaged within the scope of the present invention that other forms of sensor may be employed, for example, contact probes, microswitches, ultrasonic probes etc.

The signals from the sensors S0, S1 and S2 are connected to respective inputs of a microprocessor based control unit 26, which also receives a data input from a keyboard 28, and which provides outputs to the engraving tool 24 and a video monitor 30.

Figure 2:
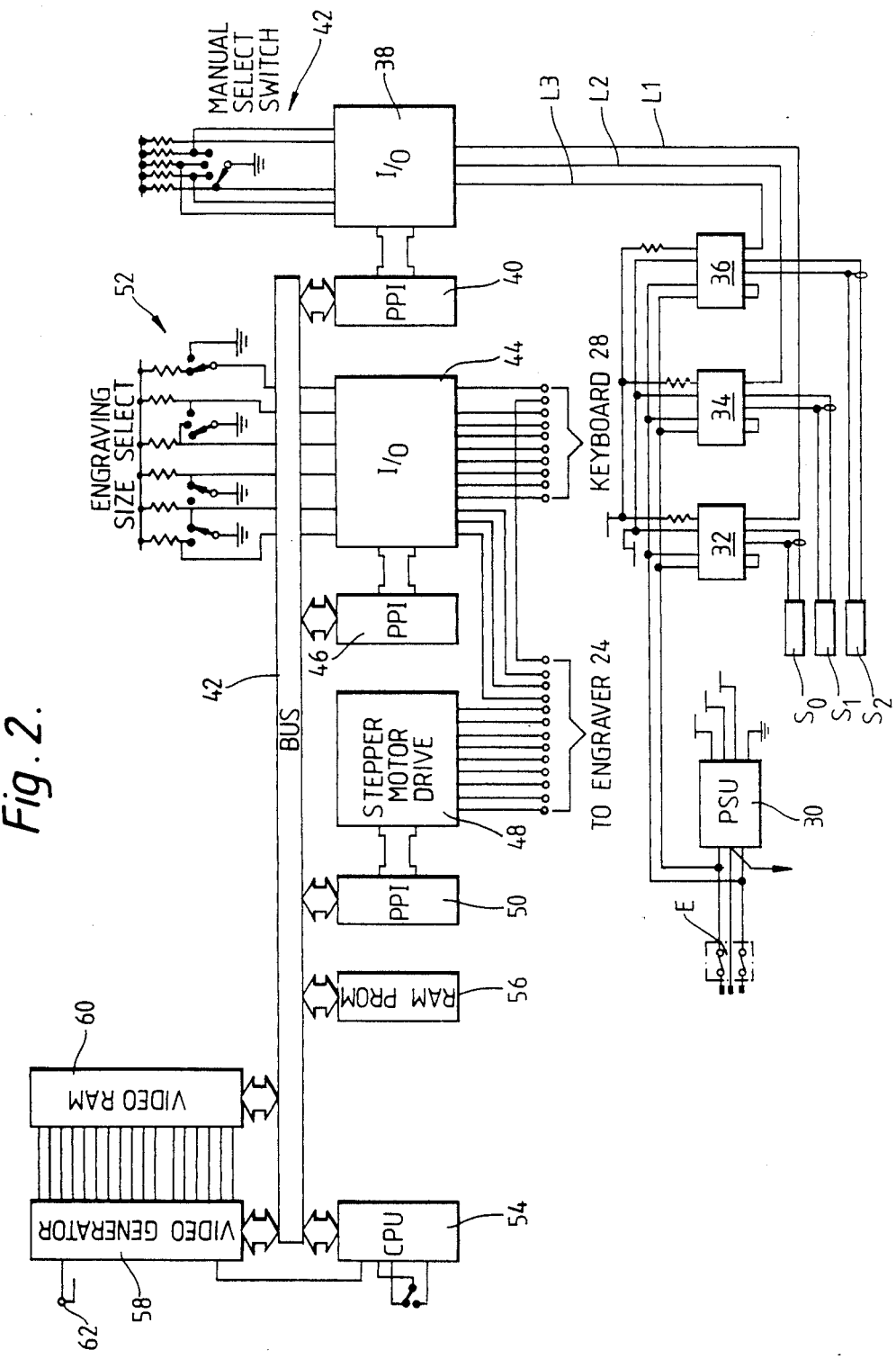
FIG. 2 is a block diagram of the microprocessor based electronic control unit of FIG. 1.
Figure 3B:
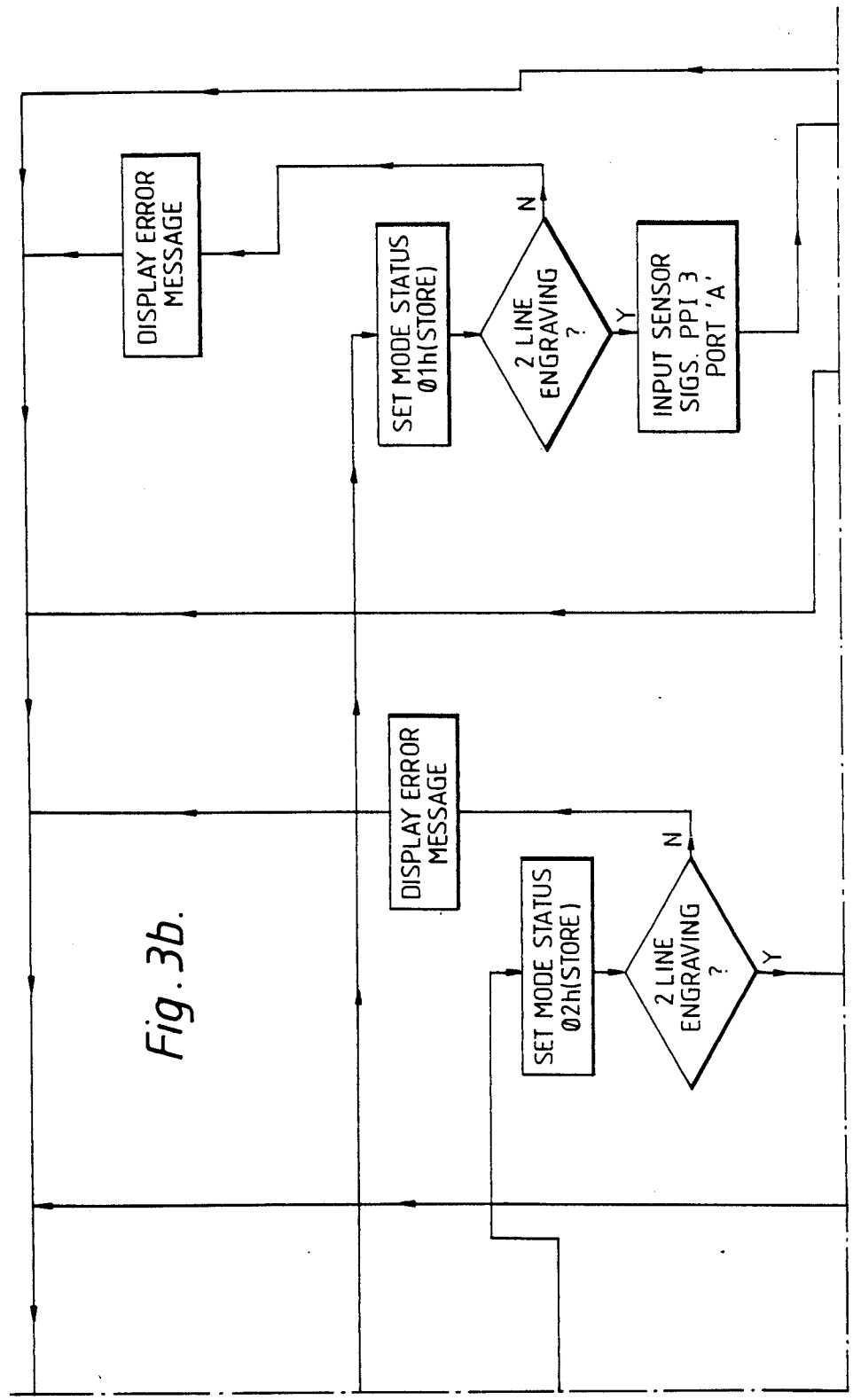
FIG. 3 shows a flow chart illustrating the operation of the control unit of FIG. 2.
Figure 3C:
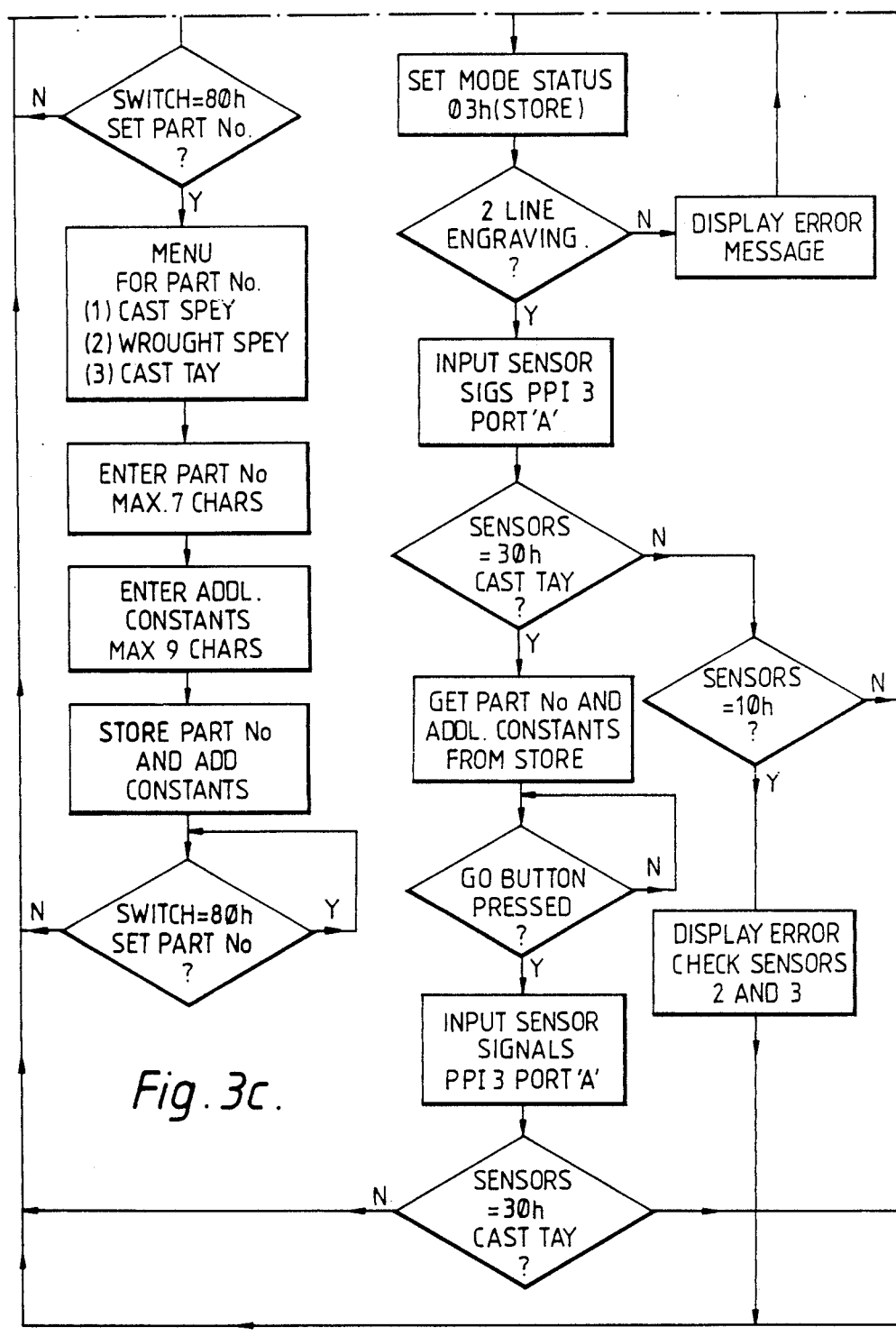
Figure 3D:
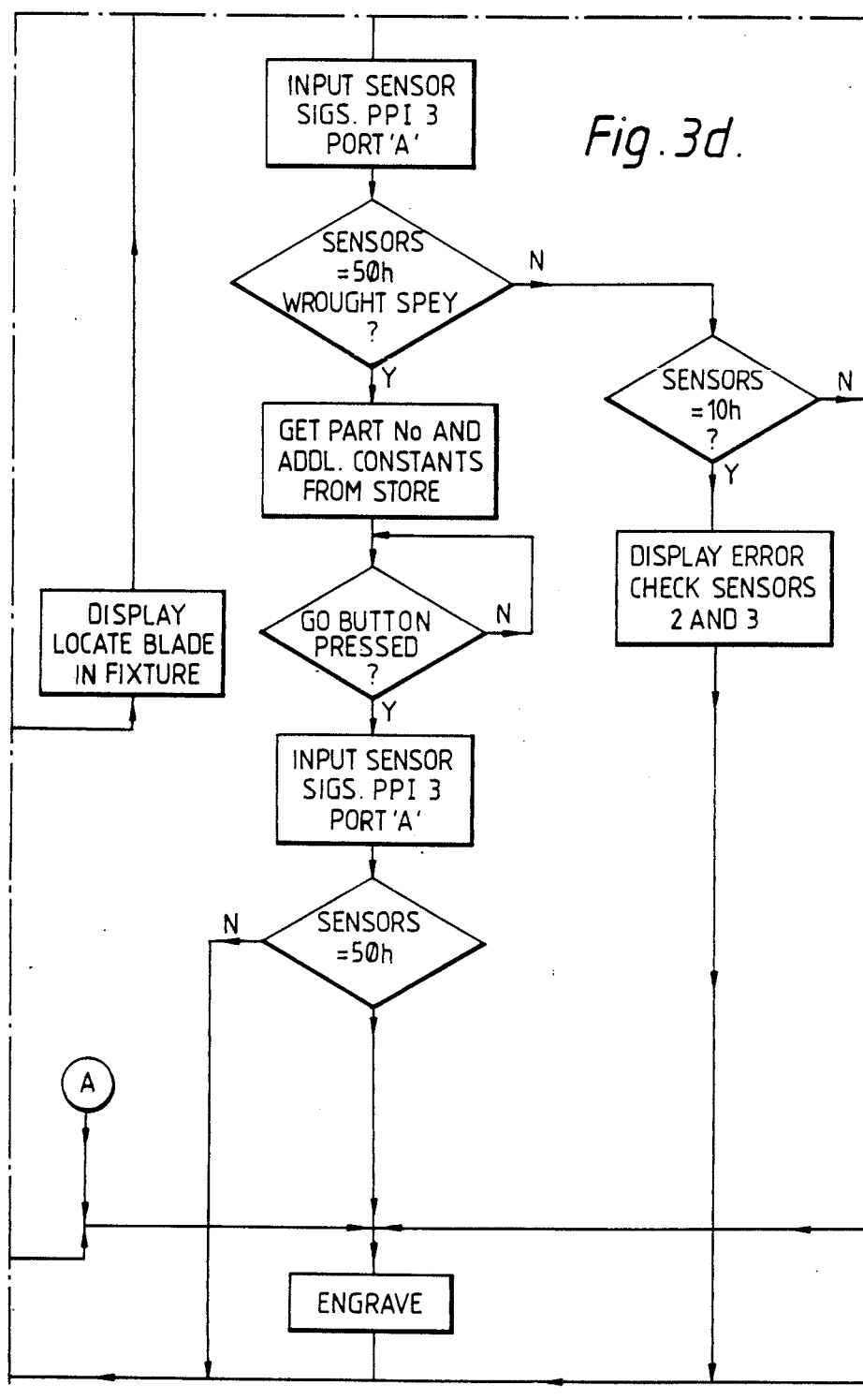
Figure 3E:
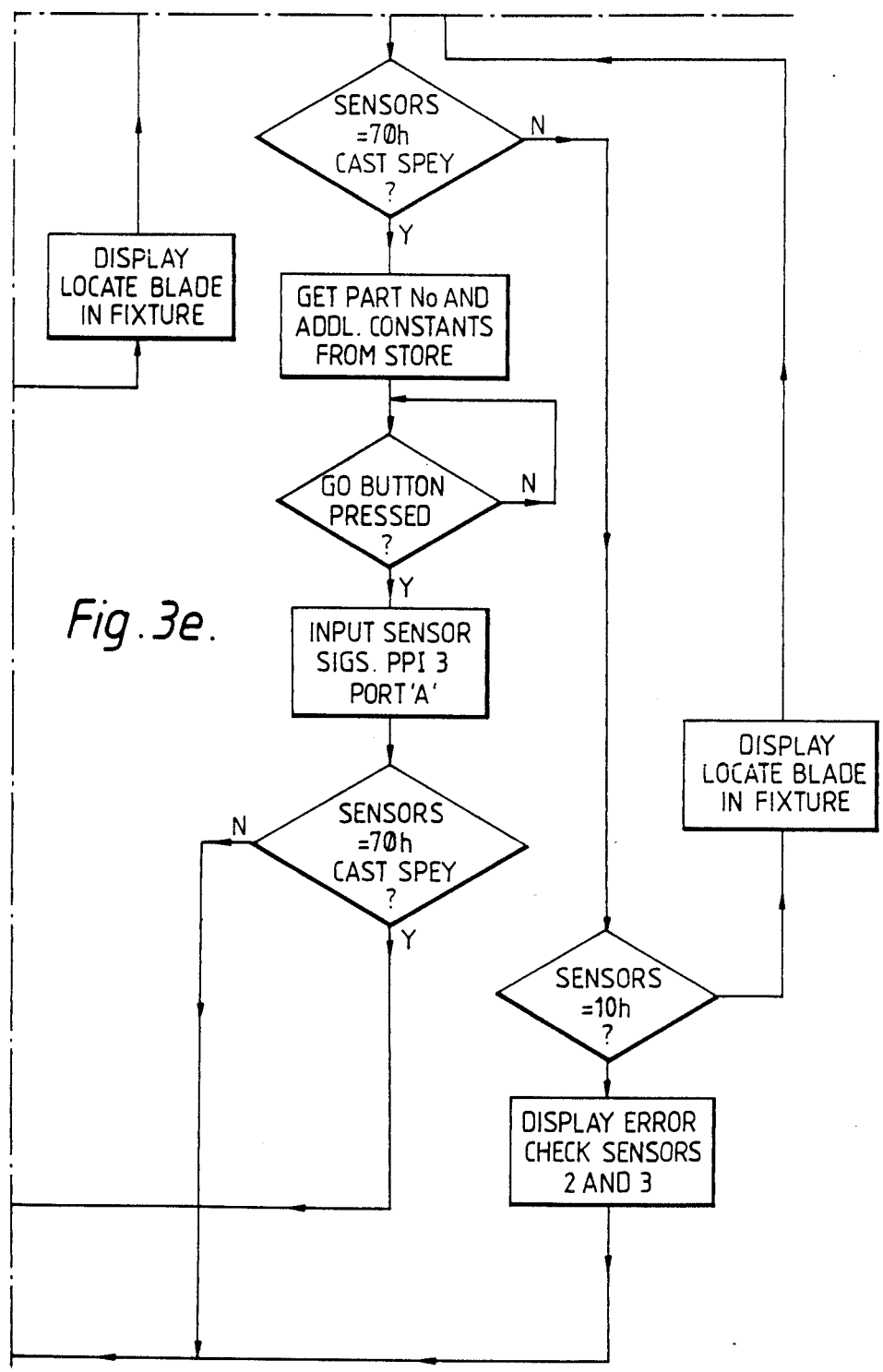

The block diagram of FIG. 2 illustrates the essential elements of control unit 26 in more detail. General power requirements of the electronics is supplied by a main power supply unit 32. In parallel with this unit the power requirements of the three sensors S0, S1, S2 are catered for individually by three further power supply units 32, 34 and 36 respectively. Each of the three power supply units includes an oscillator or pulse generator connected in circuit with one of the sensor coils as an active element. The units 32, 34 and 36 also include sensor output circuits which provide binary metal sensed/metal not sensed outputs on three signal lines L1, L2 and L3 respectively in response to the behavior of the sensor coils.

The sensor output signal lines are connected to an input/output circuit 38 and then multiplexed by a programmable periphery interface (PPI) unit 40 onto an address, data and control bus 42. As an alternative to automatic operation a range of predetermined sensor combinations may be selected manually by means of a selector switch 43 connected with the input/output circuit 38. The keyboard 28 is connected to a second input/output circuit 44 which also communicates with the bus 42 through a further PPI unit 46.

An engraving operation is controlled by signals provided on a plurality of output lines from a Stepper Motor Drive input/output circuit 48 and by signals carried on further output lines from the input/output 44. The sharing of output lines between circuits 44 and 48 comes about solely because the input/output circuit comprising a standard integrated circuit has insufficient outputs available to meet the full control requirement of the engraver 24. A fuller description of the engraver may be had by reference to the previously published British patent mentioned above, as the engraver, per se, is incidental to the present invention it is not proposed to give a more detailed description here. The circuit 48 is also interconnected with the bus 42 by means of a further PPI unit 50.

The size of engraved symbols/characters may be preselected manually by appropriate setting of one of a group of engrave size select switches generally indicated at 52 in the drawing. These switches are connected to the input/output circuit 44 and may be interrogated through the interface 46.

The electronic system is controlled by a central processing unit (CPU) 54, the operating software for which is stored in random access memory/programmable read only memory (RAM-PROM) 56. CPU 54 and RAM 56 are linked to the bus 42.

A video system is also provided in the system being described for the purpose of user interaction. The system of well known conventional type comprises a standard video generator 58 and video RAM 60 which produce a video output signal at 62 which is connected to the display monitor 30 (see FIG. 1).

The flow chart of FIG. 3, whilst not detailing every step of the software program, illustrates the major decision steps and events in the process of identifying and engraving the subject component. Referring to the logical blocks contained in FIG. 3, the program begins towards the top left of the drawing at START, and immediately carries out an initializing procedure which basically sets up the programmable interfaces 40, 46 and 50. The program then enters a main operating loop and sequences a few common steps dealing with control of the engraver 24. In particular, the size of characters, the number of lines of characters and the characters themselves are determined and stored. This character size information may be entered either by using the keyboard 28 or, if only a small number of preset options is made available by using the manual switches 42.

The exemplary embodiment is especially adapted to distinguish a range of three slightly different turbine blades, which hereinafter will be referred to as BD1, BD2 and BD3. One or another of these blade types is preselectable using the manual switch 42. For example, if an operator suspects a particular blade is of a certain type he may set switch 42 to a switch position corresponding to that type. This has the effect of selecting a reference combination of sensor outputs with which the CPU 54 can immediately compare the actual sensor outputs L1, L2 and L3. Each of the five switch positions of switch 42 gives rise to an input code in input/output circuit 38 which is read by the CPU 54. The CPU interrogates each switch code input at the beginning of each operational cycle and follows a program loop according to the code present. In the present example a hexadecimal input code "01h" indicates that the operator merely wishes to carry out an engraving operation, this is indicated by the first decision diamond symbol in FIG. 3. The main program then causes a request for details of the engraving legend to be displayed on the video monitor 30. This information is entered using the keyboard 28 and the program continues along the path marked A in the drawing and proceeds to the ENGRAVE event, in the centre bottom of the drawing.

If the code input is not "01h" the program continues by requesting information to be input about engraving character sizes. The program may be arranged to default to predetermined values in the absence of a specific input. The program next interrogates the remaining switch positions until it finds a code input. As indicated by the next three decision symbols the code inputs "02h", "03h" and "04h" correspond to preselected blades BD1, BD2, and BD3 respectively. Any one of these three input codes triggers the program to follow one of three basically identical loops, one only of which will now be described in detail.

Firstly, the program checks that the appropriate engraving information is contained in memory. If the information is not present, is incomplete or wrong an error message is displayed and the program loops back to the beginning. The sensor inputs S0, S1 and S2, are then interrogated through the PPI 40 and the input/output circuit 38 and the sensor input combination is compared with a predetermined signal combination stored in memory. If the sensor input combination does not correspond the program leaves the main loop and enters a fault loop where, in a first step, the actual sensor input combination is determined. One of the sensors S0 is disposed to sense the presence of any of the expected turbine blades and so given a positive output whenever a blade is loaded in the cradle 12, see FIG. 1. In the absence of a positive output from sensor S0 the fault loop branches back to the beginning of the main program and displays on the video monitor 30 the message "Locate Blade in Fixture". If sensor S0 is found to be producing a positive output the fault loop follows a second branch back to the beginning and displays a different error message "Check Sensors".

However, if the sensor inputs correspond correctly with the stored expected values the program follows its main path and reads the engraving legend from memory. Essentially the stored legend is now engraved onto the blade located in the cradle 12 by the engraver 24, in the manner described in detail in GB No. 2 002 694. It is preferred, in the example being described to require an operator input at this stage to confirm that engraving is still required.

The apparatus may be used to check that a previously engraved no, and therefore the previous identification of the component, is correct. A second engraving operation would not, in that case, be required. Also, before executing the engraving operation the sensor outputs are rechecked against the stored sensor output combination as a guard against the original blade being substituted by another. In the even of lack of correspondence the program fails to execute the engraving and, instead, defaults back to the beginning of the program.

Each of the three program loops dedicated to identifying one or another of the predetermined components is basically identical, although the sensor input combinations and part numbers are unique for each blade. In the example being described the sensor S0, as previously mentioned, positively responds to the presence of any of the blades in the cradle 12. Sensor S1 is disposed to respond to blades having a lateral dimension in the region of the blade root shank within the sensing range of the sensor. Therefore, sensor S1 measures the lateral dimension of the blade with respect to a longitudinal centre line. Sensor S1 is positioned generally along the centre line at a predetermined distance from the root and clamp reference so that it produces a positive output for blades having a length greater than the span from the clamp to the edge of the sensor. It will be apparent that sensors positioned differently than those described above may be employed, and also that further additional sensors may be required in order to discriminate between greater numbers of types of components. It is taken as self evident that the invention is not restricted to discriminating between turbine blades for gas turbine engines.

Returning to FIG. 3, there is also a fifth select switch position which produces, in the input/output circuit 38, a code "80h" which the program recognizes as its cue for setting up fresh part numbers. In response to this code the program enters a short sub-routine the first step of which is to display on the monitor a part number/component menu. In this sub-routine the keyboard 28 is used to enter fresh part numbers, or to change existing part numbers and these are stored in the RAM 56 for future control of the engraver 24.

In a further embodiment of the invention the apparatus is provided with an automatic mode of operation which does not rely upon manual pre selection of the blade type. Instead, whenever a valid sensor input signal combination is detected the input code is used to address a corresponding memory location in the RAM at which the appropriate part no is stored. As a precaution the input code may be stored for the duration of each program cycle and, as before, the current sensor code input may be rechecked against the initial code input before engraving is commenced to ensure that a different type of blade has not been substituted.

The above example is given merely as an illustration of one way of carrying out the invention in practice, it will be understood that features of other embodiments of the same invention may vary from the features described above without departing from the principles of the invention.

The physical properties monitored or measured for the purpose of identifying a component are to be construed as encompassing a property which can be usefully used to differentiate between types of component. Thus, for example, in addition to measuring component dimensions as described, magnetic properties and weight may also be measured as well as other properties as appropriate.

We claim:

1. A marking or engraving machine comprising means for identifying a range of different types of components, memory means for storing in machine readable form part numbers for each of the different types of component, means responsive to an identification of a component to retrieve from said memory means a corresponding part number and means operative to mark or engrave said part number on the component.

2. A marking or engraving machine as claimed in claim 1 wherein the means for identifying the different components comprises means for sensing differences between physical properties of the different types of components.

3. A marking or engraving machine as claimed in claim 2 wherein the sensing means comprise a metal proximity detecting means.

4. A marking or engraving machine as claimed in claim 2 wherein the sensors are disposed such that, within the range of component types, each type gives rise to a different combination of sensor outputs.

5. A marking or engraving machine as claimed in claim 4 wherein each combination of sensor outputs corresponds to a memory location at which is stored the corresponding part number to be retrieved.

6. A marking or engraving machine as claimed in claim 1 wherein the means for identifying the components comprises a plurality of sensing means spaced apart one from another to sense differences in physical size between the range of components.

7. A marking or engraving machine as claimed in claim 1 and further comprising means for comparing an identification of a component with a preliminary manually selected identification.

8. A marking or engraving machine as claimed in claim 1 and further comprising a power operated engraving tool for engraving a part with its identified part number.

9. A marking or engraving machine as claimed in claim 8 wherein each part number is stored in the memory means in the form of operating instructions for the power operated engraving tool.

10. A marking or engraving machine as claimed in claim 9 wherein an engraving operation to implement the engraving instructions retrieved from the memory means proceeds in response to an operator input.

11. A marking or engraving machine as claimed in claim 1 and further comprising an interactive microprocessor system including sensing means, memory means, engraving means and a video display means for prompting operating instructions.

* * * * *